Sept. 27, 1955  J. SCHENCK  2,719,127
NEUTRON-SENSITIVE SCINTILLATORS
Filed Sept. 30, 1953

INVENTOR
James Schenck
BY Mason, Fenwick & Lawrence
ATTORNEYS

United States Patent Office 2,719,127
Patented Sept. 27, 1955

2,719,127
NEUTRON-SENSITIVE SCINTILLATORS

James Schenck, Oak Ridge, Tenn.

Application September 30, 1953, Serial No. 383,322

8 Claims. (Cl. 252—301.4)

This invention relates to new and improved scintillators and, more specifically, to scintillators which are highly sensitive to neutron radiation.

Scintillators are employed for the detection and energy measurement of single quanta or particles of radiation and comprise luminescent materials, or phosphors, which emit a short pulse of light in response to the ionization produced in the phosphor by a quantum or particle of radiation, as, for example, in the form of gamma or beta rays. The efficacy of a given scintillator is determined by its luminescence efficiency and its ability to emit a quantity of light proportional to the energy of the radiation impinging thereon.

For satisfactory performance as a scintillator, the phosphor must be in a form such that a minimum of the luminescent light is scattered and that a constant and, preferably, also a minimum amount of the luminescent light be absorbed in traveling through it to the light collecting phototube. This is essential to ensure that the scintillator emits to the measuring device an amount of luminescent radiation which is substantially proportional to the amount of ionization produced by the exciting radiation. To satisfy these conditions, a solid crystalline phosphor should be in the form of a single optically clear crystal of appreciable size.

Since neutrons, unlike other types of radiation such as gamma or beta rays, do not ionize matter, an additional mechanism is required to bring about ionization by neutron excitation. Neutrons impinging on a lithium-containing phosphor interact with the lithium to produce charged particles with consequent excitation of the phosphor. Various lithium salts, including lithium iodide activated with thallium and tin salts, have been investigated with regard to their neutron-detection properties. These phosphors, however, have proven deficient in certain respects, as for example, in the resolution and pulse height obtained.

The object of this invention is to provide scintillators which are highly responsive to neutron radiation and which are considerably more efficient than phosphors hitherto made for the purpose.

Other objects and advantages of my invention will become apparent from the following detailed description and the accompanying drawings.

Figure 1:
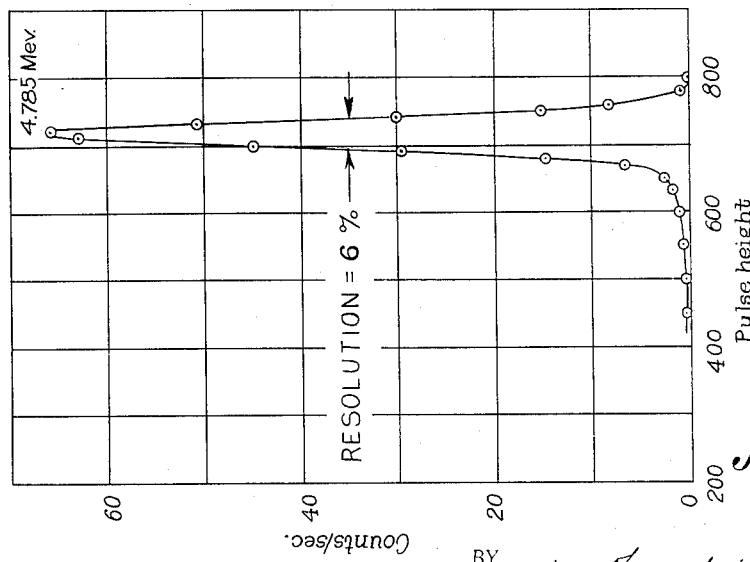

In the drawings, Fig. 1 is a graph showing the pulse height spectrum obtained when lithium iodide activated with europium is bombarded with slow neutrons.

Figure 2:
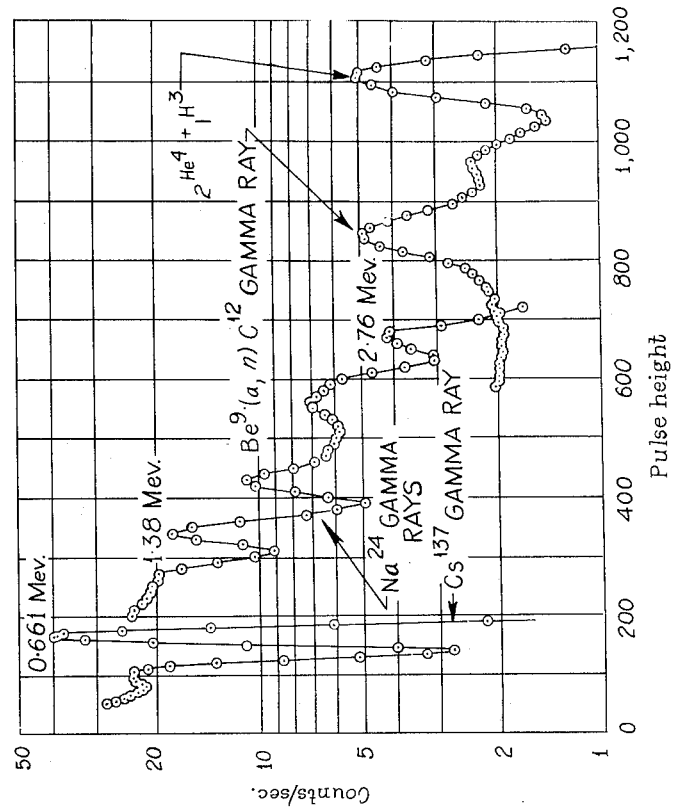

The graph of Fig. 2 is a pulse height spectrum obtained when lithium iodide activated by europium is exposed to gamma rays and neutrons from different sources.

I have discovered that lithium iodide activated with a small amount of a europium compound is a neutron-sensitive phosphor material of considerably greater luminescence efficiency than has hitherto been obtained. In addition to its high radiation sensitivity, the phosphor possesses other important practical advantages in as much as it can be made into an optically clear crystal which can be employed as a scintillation counter of such small sensitive volume as to require a minimum of shielding to minimize the effect of stray radiation.

The scintillator crystal may be prepared by melting lithium iodide to which a small amount of a europium compound has been added and growing the crystal within the melt by carefully regulated cooling, preferably under vacuum, in conventional manner. The lithium iodide should be in highly purified form. The concentration of europium in the lithium iodide may be varied within a range of about 0.0001 to 0.1 mol percent and preferably within a range of about 0.001 to 0.1 mol percent. Higher proportions may be objectionable because of possible discoloration of the crystal. The rough crystals produced from the melt are subsequently cut and polished into the desired size and shape to form the finished scintillator crystal. The finished crystal should be at least 1 mm. in any given dimension, namely in width, length or height, and preferably larger. In the case of a rectangular crystal, for example, the dimensions should be the minimum of a 1 mm. cube. The length and diameter of a cylindrical crystal should each be at least 1 mm. The crystals are clear and transparent and give a strong blue luminescence under 2537A. ultraviolet excitation.

The activation is produced by the europium cation so that substantially any europium compound which is soluble in the lithium iodide melt may be employed. Although the europium is active primarily in its divalent state, compounds containing trivalent europium, such as europic chloride, may also be used since the trivalent cation is reduced to the divalent form under the conditions of crystal formation due to thermal decomposition and growth of the crystal under vacuum. For example, when europic chloride is used, the following reaction takes place at the elevated temperature of the melt:

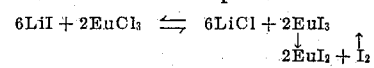

Examples of europium compounds which can be employed include europium oxide and salts such as the europium halides, europium nitrate and europium sulfate. Europium chloride gives particularly effective results.

When subjected to neutron radiation, the LiI(Eu) crystals possess high luminescence efficiency both in terms of resolution and pulse heights obtained. The resolution is the quotient of the line width at one-half the pulse height divided by the pulse energy. The smaller the resolution in percent, the more accurate is the response of the phosphor.

Example I

A section cut from a rough crystal of lithium iodide containing 0.05 mol percent europous chloride was finished with 320 grit abrasive paper into a cylinder 2 cm. in diameter and 1.5 cm. in length. The cylinder was mounted within a polished reflecting cup and connected to a 5819 photomultiplier tube with a Lucite light-piper. The photomultiplier was connected to a standard amplifier. Operation of the resulting scintillation detector under radiation was studied by means of a standard cathode-ray oscilloscope.

Example II

The LiI(Eu) crystal of the scintillation counter described in Example I was subjected to a stream of slow neutrons. The neutrons were derived from a polonium-beryllium source moderated in paraffin. The crystal was shielded from the gamma rays radiated by the polonium-beryllium by means of three inches of lead. Fig. 1 shows the pulse height spectrum obtained. The resolution for products of the Li$^6$(n,α)H$^3$ reaction at the 4.785 m. e. v. peak is 6%. This is considerably better than the best resolution of 15.1% hitherto obtained with lithium iodide activated with stannous iodide.

Example III

The LiI(Eu) crystal of the scintillation counter described in Example I was irradiated with (a) gamma rays from caesium$^{137}$, (b) gamma rays from sodium$^{24}$ and (c) gamma rays and neutrons from a polonium-beryllium source. The neutrons from the polonium-beryllium were moderated by paraffin and a partial shield of boron carbide was placed between the moderated neutron source and the phosphor crystal in order to attenuate the neutron peak so that it would not interfere with the gamma ray peak. The energy calibration was determined from the known values of the Na$^{24}$ gamma rays. A standard calibrated pulse generator was used to obtain corrections for slight deviations from linearity of the apparatus.

The pulse spectra obtained are shown in Fig. 2 and illustrate the great sensitivity and resolution of the LiI(Eu) crystal. The high degree of resolution, for example, is shown by the clear separation of the line produced by impingement on the crystal of the gamma rays from the polonium-beryllium source from the line produced by neutron excitation from the same source. The photoelectric peak at 843 pulse height divisions results from the production of electron-positron pairs in the crystal by the gamma rays of the polonium-beryllium source. These gamma rays are the product of the excited state of C$^{12}$ in the Be$^9(\alpha,n)$C$^{12}$ reaction in the polonium-beryllium. The peak at 1126 pulse height divisions is caused by the alpha (He$^4$) and triton (H$^3$) products of the Li$^6(n,\alpha)$H$^3$ reaction induced in the crystal by the moderated neutrons from the polonium-beryllium source.

Example IV

A LiI(Eu) crystal was subjected to a neutron beam containing neutrons of different energies, namely neutrons having thermal, 2 m. e. v. and 3 m. e. v. energies. The scintillation pulses were amplified and observed on an oscilloscope screen. The pulse heights corresponding to the different neutron energies were clearly distinguishable on the oscilloscope screen, clearly demonstrating the sensitivity and resolution power of the phosphor.

Although this invention has been described with reference to illustrative embodiments thereof, it will be apparent to those skilled in the art that the principles of this invention may be embodied in other forms but within the scope of the claims.

I claim:

1. A neutron-sensitive scintillator comprising a single crystal of lithium iodide activated with at least about 0.0001 mol percent europium.

2. A neutron-sensitive scintillator comprising a single crystal of lithium iodide activated with at least about 0.0001 mol percent europium, said crystal being at least 1 mm. long in each dimension.

3. A neutron-sensitive scintillator comprising a single crystal of lithium iodide activated with about 0.0001 to 0.1 mol percent europium, said crystal being at least 1 mm. long in each dimension.

4. A neutron-sensitive scintillator comprising a single crystal of lithium iodide activated with about 0.0001 to 0.1 mol percent europium, said crystal being at least 1 mm. long in each dimension.

5. A neutron-sensitive scintillator comprising a single crystal of lithium iodide activated with europium chloride, the europium comprising at least about 0.001 percent, said crystal being at least 1 mm. long in each dimension.

6. A neutron-sensitive scintillator comprising a single crystal of lithium iodide activated with about 0.05 mol percent europous chloride, said crystal being at least 1 mm. long in each dimension.

7. A neutron-sensitive scintillator comprising lithium iodide activated with at least about 0.0001 mol percent europium, said scintillator being at least 1 mm. long in each dimension.

8. A neutron-sensitive scintillator comprising lithium iodide activated with europium halide, the europium comprising at least about 0.001 mol percent, said scintillator being at least 1 mm. long in each dimension.

References Cited in the file of this patent

Curran-Luminescence and the Scintillation Counter, pp. 133–135, 152, 153. Publisher—Academic Press, Inc., New York. (Copy in Sci. Lib.)